P. W. KANE.
APPARATUS FOR TRANSFORMING ENERGY.
APPLICATION FILED FEB. 2, 1914.
1,116,293.
Patented Nov. 3, 1914.
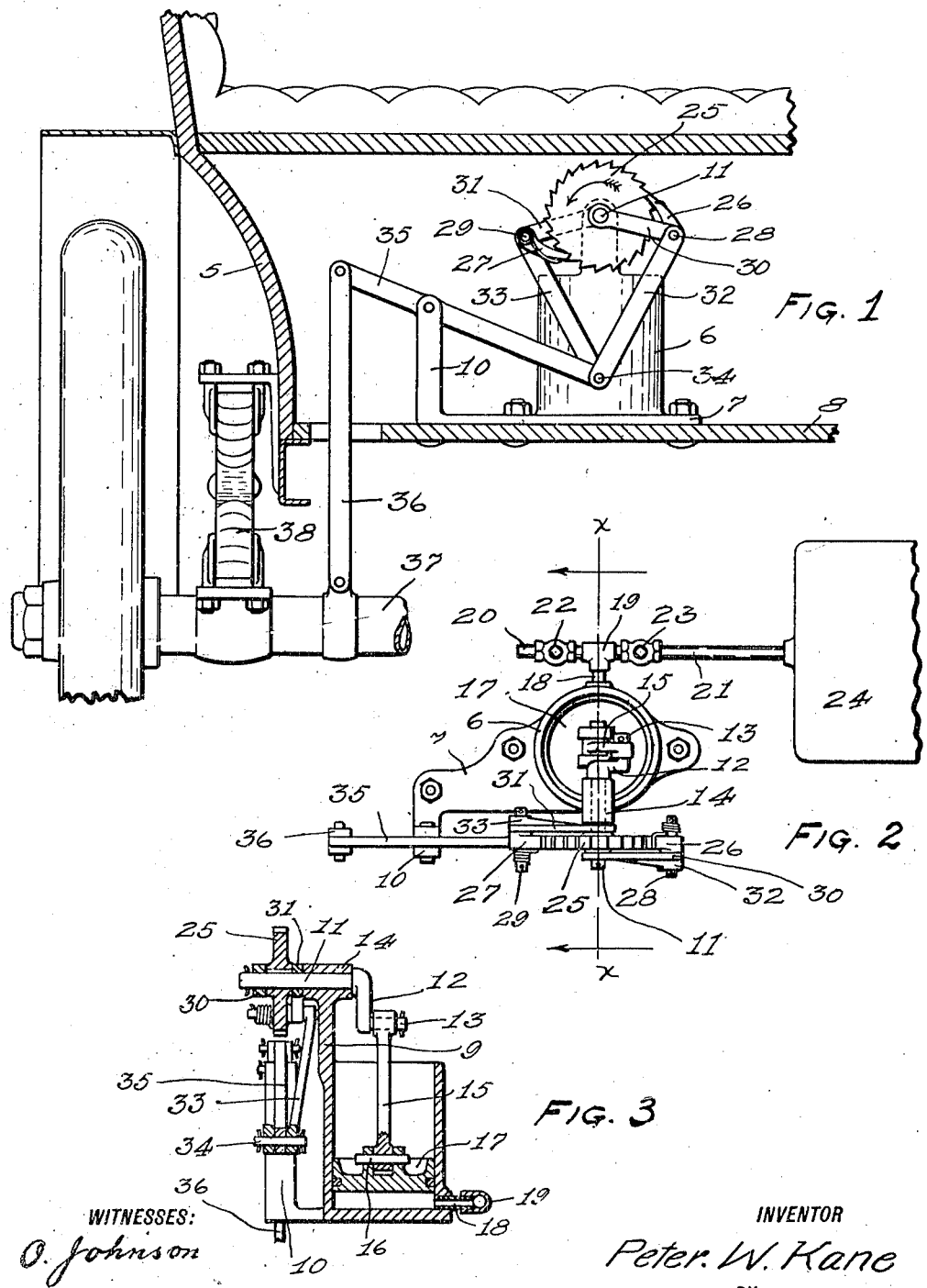
WITNESSES:
O. Johnson
F. C. Matheny
INVENTOR
Peter. W. Kane
BY
C. D. Harkins
ATTORNEY

UNITED STATES PATENT OFFICE.

PETER W. KANE, OF CENTRALIA, WASHINGTON, ASSIGNOR OF THIRTY-SEVEN AND ONE-HALF ONE-HUNDREDTHS TO JOSEPH G. WATERS AND TWENTY-FIVE ONE-HUNDREDTHS TO EDWARD N. PEARCE, BOTH OF CENTRALIA, WASHINGTON.

APPARATUS FOR TRANSFORMING ENERGY.

1,116,293.     Specification of Letters Patent.     Patented Nov. 3, 1914.

Application filed February 2, 1914. Serial No. 816,000.

*To all whom it may concern:*

Be it known that I, PETER W. KANE, a citizen of the United States, residing at Centralia, in the county of Lewis and State of Washington, have invented a certain new and useful Improvement in Apparatus for Transforming Energy, of which the following is a specification.

My invention relates to improvements in means for converting into useful work the energy that may be developed by the relative movements of the body and the running gear of a vehicle that is provided with springs of any ordinary type which are disposed between such members when such vehicle is traveling over an uneven surface, as a rough street or road, and the object of my improvement is to provide suitable mechanism that is adapted to be connected with and between the body portion and the running gear of such vehicle in such manner that when a relatively vertical movement between the body and the running gears of the vehicle occurs then such movement will actuate said mechanism to operate an air compressor to store compressed air within a tank that may be associated with said vehicle, which compressed air may become available for service as power to operate a starting mechanism that may be attached to said vehicle and to operate a signal whistle or do other useful work. I accomplish this object by devices illustrated in the accompanying drawings in which—

Figure 1 is a view in side elevation of a device embodying my invention as it appears when associated with an automobile, a portion of which device is shown in cross-section; Fig. 2 is a fragmentary plan view of the same and Fig. 3 is a view in vertical section on broken line *x*, *x* of Fig. 2.

Referring to the drawings, throughout which like reference numerals indicate like parts, 5 is the body of an automobile in connection with which, for the purpose of illustration, I have shown my invention, although obviously it may be used equally well in connection with other spring vehicles, and 6 is the cylinder of an air pump which is preferably cast with an integral base 7 by means of which it may be secured to a floor 8 of the automobile 5, and which is further provided with integral bearing brackets 9 and 10 which support different mechanisms hereinafter described.

Shaft 11, which is provided on one of its ends with a crank arm 12 which carries a crank pin 13, is journaled in a bearing box 14 provided on the bracket 9, the crank pin 13 being articulated with one end of a connecting rod 15 whose other end is articulated by a pin 16 with a cylindrical piston 17 that is adapted to reciprocate within the cylinder 6 to pump air.

The cylinder 6 is provided at a point near its bottom with an air inlet and discharge pipe 18 which is connected by a T fitting 19 with other pipes 20 and 21, the pipe 20 being provided with a check valve 22 that permits air to be drawn into the cylinder 6 on the upward stroke of the piston but prevents air from passing outwardly therethrough on the downward stroke of the piston and the pipe 21 being provided with a check valve 23 that permits air to be forced outwardly therethrough from the cylinder 6 but prevents air from being drawn inwardly therethrough to the cylinder 6, such pipe 21 being adapted to communicate with an air reservoir 24 in which compressed air may be stored, whereby when the piston 17 is caused to reciprocate within the cylinder 6 air will be drawn in through the pipe 20 and forced outwardly into the air reservoir 24 through the pipe 21.

A toothed ratchet wheel 25 is secured to that end of the shaft 11 which is opposite the crank arm 12, as clearly shown in Fig. 3, such ratchet wheel 25 being adapted to be engaged with and rotated by oppositely disposed spring pressed pawls 26 and 27 that are mounted on pivots 28 and 29 which pivots also connect the outer ends of guide links 30 and 31 with the upper ends of actuating links 32 and 33. The inner ends of the guide links 30 and 31 are pivoted on the shaft 11, as clearly shown in Fig. 3, and the lower ends of the actuating links 32 and 33 are articulated by a common pivot 34 with one end of a lever arm 35 which is fulcrumed in the bracket 10 and has its other end pivotally connected with a link 36 that is secured to the axle 37 or to some other fixed portion of the running gear of a vehicle.

Any desired number of my air compressing devices may be attached to a single vehicle although I have found it convenient when used in connection with an automobile to employ two of such devices which preferably may be disposed underneath the rear seat of such automobile at points near the sides thereof and connected with the axle 37, as illustrated in Fig. 1.

The operation of my device is simple and may be described as follows:—When the device is disposed beneath the rear seat of an automobile and connected with the axle 37, as shown in Fig. 1, it is ready for operation and as the automobile is caused to move over ordinary roadbed or pavement a vibration of the spring 38 occurs, such spring 38 permitting the body 5 to approach the axle 37 and then reacting to throw the body upward thus causing a relative movement between the body 5 and the axle 37 which movement acts through the link 36 to move the lever arm 35 about its pivot. As the body of the vehicle moves downwardly the outer end of the lever arm 35 is raised and the inner end of such lever arm 35 is lowered thus pulling downwardly the links 32 and 33 to which are secured the spring pressed pawls 26 and 27, this causing the pivots 28 and 29 to move downwardly and to describe the arc of a circle that has the axis of the shaft 11 for its center and the links 30 and 31 respectively for its radii such links 30 and 31 being approximately the same length. As the pivot 29 moves downwardly the pawl 27 engages with the teeth of the ratchet wheel 25 to move such ratchet wheel 25 in the direction indicated by the arrow in Fig. 1. When the body 5 reaches the limit of its downward movement and the spring 38 reacts to throw such body upward then the inner end of the lever arm 35 will be moved upwardly in an obvious manner thus moving upwardly the links 32 and 33 and causing the pawl 26 to engage with the teeth of the ratchet wheel 25 to rotate such ratchet wheel 25 in the direction indicated by the arrow in Fig. 1. The vibration of the body 5 thus serving to rotate the ratchet wheel 25 and its shaft 11 in a constant direction, and the crank arm 12 of the shaft 11, will cause the piston 17 to reciprocate within the cylinder 6 to compress air in the tank 24 which compressed air may be used for various purposes as for instance it may be used to operate a self starting device, to operate air brakes, to blow a siren or whistle or to inflate pneumatic tires.

Manifestly numerous changes in the form of details and the arrangement of the various parts of my device may be resorted to without departing from the spirit of my invention or sacrificing any of its advantages.

What I claim is:—

The combination with a spring-supported vehicle body, of a tank, a cylinder having pipe connections with said tank, standards rising from the cylinder base, a shaft mounted upon one of said standards, a crank on one end of said shaft, a piston in said cylinder, a rod connecting said piston and crank, a ratchet wheel on the opposite end of said shaft having peripheral teeth, pawls on opposite sides of said wheel, a lever fulcrumed on the other standard, a link connecting one end of said lever with the axle, and two pairs of oppositely-diverging links connecting said lever with said shaft, the pivotal connections between said pairs also serving as the pawl pivots.

In witness whereof, I, hereunto subscribe my name this 19th day of January, A. D., 1914.

PETER W. KANE.

Witnesses:
FRANK WARREN,
F. C. MATHENY.